(12) United States Patent
Hsiung et al.

(10) Patent No.: US 8,444,793 B2
(45) Date of Patent: May 21, 2013

(54) SEMICONDUCTOR DEVICE AND FABRICATING METHOD THEREOF

(75) Inventors: Hsin-Chang Hsiung, Tainan County (TW); Shu-Lin Ho, Tainan County (TW)

(73) Assignees: Himax Semiconductor, Inc., Fonghua Village, Xinshi Dist., Tainan (TW); Core Precision Material Co., Ltd., Pusin Village, Pusin, Dayuan Township, Taoyuan County (TW)

( * ) Notice: Subject to any disclaimer, the term of this patent is extended or adjusted under 35 U.S.C. 154(b) by 374 days.

(21) Appl. No.: 12/701,615

(22) Filed: Feb. 8, 2010

(65) Prior Publication Data

US 2011/0195257 A1 Aug. 11, 2011

(51) Int. Cl.
*B29C 73/04* (2006.01)
*B29C 65/54* (2006.01)
*B29C 63/22* (2006.01)
*B32B 37/06* (2006.01)
*B32B 37/12* (2006.01)
*B32B 38/10* (2006.01)
*B32B 43/00* (2006.01)
*C08J 5/12* (2006.01)

(52) U.S. Cl.
USPC ............ 156/94; 156/230; 156/247; 156/289; 156/307.1; 156/701; 156/711

(58) Field of Classification Search
USPC ................ 156/94, 230, 247, 289, 307.1, 701, 156/711; 428/147, 349, 355 R; 257/778, 257/782, 783
See application file for complete search history.

(56) References Cited

U.S. PATENT DOCUMENTS 4,049,483 A * 9/1977 Loder et al. .................... 156/230
5,783,867 A * 7/1998 Belke et al. .................... 257/783

* cited by examiner

*Primary Examiner* — Sing P Chan
(74) *Attorney, Agent, or Firm* — Winston Hsu; Scott Margo

(57) ABSTRACT

The present invention provides a semiconductor device and a fabricating method thereof. The fabricating method comprises: providing a first substrate; forming a soft dry film having an adhesive film and a release film; sticking the soft dry film on the first substrate with the adhesive film; removing the release film; sticking a second substrate on the adhesive film; and heating the adhesive film to solidify the adhesive film to form a solid adhesive film. The semiconductor device comprises: a first substrate, a solid adhesive film, and a second substrate. The solid adhesive film is formed on the first substrate, and the second substrate is formed on the solid adhesive film.

3 Claims, 3 Drawing Sheets

SEMICONDUCTOR DEVICE AND FABRICATING METHOD THEREOF

BACKGROUND OF THE INVENTION

1. Field of the Invention

The present invention relates to a fabricating method, and more particularly, to a semiconductor device and a fabricating method thereof.

2. Description of the Prior Art

A conventional fabricating method utilizes liquid glue to stick two substrates. However, since the glue is fluid, the thickness of the glue can not be adjusted according to different design requirements, and the traditional semiconductor device and the fabricating method thereof can not provide good positioning precision, enough peeling strength, and high production amount.

In addition, if the glue has defects when the traditional semiconductor device is fabricated, it is difficult to remove the glue completely to repair the traditional semiconductor device.

SUMMARY OF THE INVENTION

It is therefore one of the objectives of the present invention to provide a semiconductor device and a fabricating method thereof that are capable of providing higher positioning precision, higher production amount, and higher peeling strength for the semiconductor device applied to a compact camera module (CCM), a wafer level lens, or a pico projector. The thickness of the adhesive film of the semiconductor device can be adjusted according to different design requirements, and the solid adhesive film of the semiconductor device is repairable.

According to an embodiment of the present invention, a fabricating method of a semiconductor device is disclosed. The fabricating method comprises: providing a first substrate; forming a soft dry film having an adhesive film and a release film; sticking the soft dry film on the first substrate with the adhesive film; removing the release film; sticking a second substrate on the adhesive film; and heating the adhesive film to solidify the adhesive film to form a solid adhesive film.

According to an embodiment of the present invention, a semiconductor device is disclosed. The semiconductor device comprises: a first substrate, a solid adhesive film, and a second substrate. The solid adhesive film is formed on the first substrate, and the second substrate is formed on the solid adhesive film.

Briefly summarized, the semiconductor device and the fabricating method thereof disclosed by the present invention can provide higher positioning precision, higher production amount, and higher peeling strength for the semiconductor device applied to a compact camera module (CCM), a wafer level lens, or a pico projector. The thickness of the adhesive film of the semiconductor device can be adjusted according to different design requirements, and the solid adhesive film of the semiconductor device is repairable.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ".

Figure 1:
FIG. 1 to FIG. 5 show schematic diagrams illustrating a fabricating method of a semiconductor device according to an embodiment of the present invention.

Please refer to FIG. 1 to FIG. 5. FIG. 1 to FIG. 5 show schematic diagrams illustrating a fabricating method of a semiconductor device 100 according to an embodiment of the present invention. As shown in FIG. 1, the present invention firstly provides a first substrate 110 of the semiconductor device 100.

Figure 2:

Next, as shown in FIG. 2, the fabricating method of the present invention forms a soft dry film 120 having an adhesive film 122 and a release film 124, wherein the adhesive film 122 can comprise a thermal set material, a thermal plastic material, and an epoxy resin. The step of forming the soft dry film 120 can further comprise adjusting a thickness of the adhesive film 122. The adhesive film 122 is a solid state material, and thus the thickness of the adhesive film 122 can be adjusted according to different design requirements. For example, the thickness of the adhesive film 122 can be arbitrarily adjusted in a range of 10~200 micrometers in this embodiment.

Figure 3:
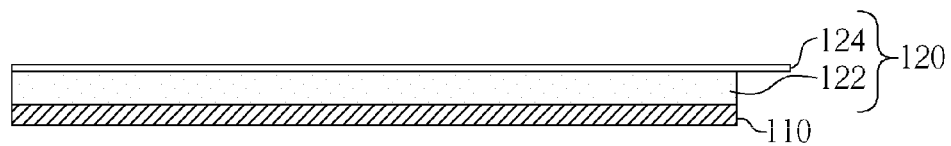

Next, as shown in FIG. 3, the fabricating method of the present invention sticks the soft dry film 120 on the first substrate 110 with the adhesive film 122. After the adhesive film 122 is stuck on the first substrate 110, the corresponding position between the first substrate 110 and the adhesive film 122 will not shift at all.

Figure 4:
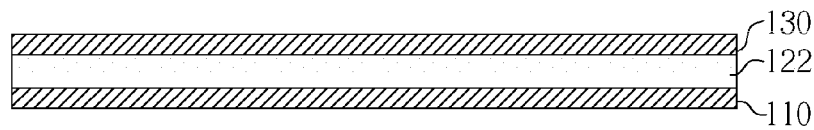

Next, as shown in FIG. 4, the fabricating method of the present invention removes the release film 124, and then sticks a second substrate 130 of the semiconductor device 100 on the adhesive film 122. After the second substrate 130 is stuck on the adhesive film 122, the corresponding position between the second substrate 130 and the adhesive film 122 will not shift at all. Thus, the present invention can provide a high positioning precision between the first substrate 110 and the second substrate 130.

Figure 5:
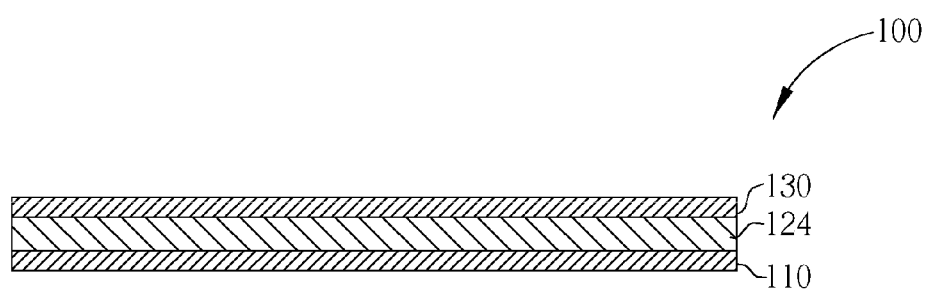

Next, as shown in FIG. 5, the fabricating method of the present invention can heat the adhesive film 122 to solidify the adhesive film 122 to form a solid adhesive film 124 since the adhesive film 122 comprises a thermal set material. In this way, the joint positions between the first substrate 110 and the solid adhesive film 124 and the joint positions between the second substrate 130 and the solid adhesive film 124 all have high peeling strength. In addition, please note that the thickness of the solid adhesive film 124 is the same as the thickness of the adhesive film 122. In other words, the thickness of the adhesive film 122 will not be changed after being heated and solidified. As shown in FIG. 5, the present invention discloses a semiconductor device 100 comprising a first substrate 110, a solid adhesive film 124, and a second substrate 120.

In addition, since the adhesive film 122 comprises a thermal plastic material, when the solid adhesive film 124 has defects, the fabricating method of the present invention can further comprise performing a repair process by heating the solid adhesive film 124 to remove the solid adhesive film 124, and a new solid adhesive film can be formed according to the above steps shown in FIG. 2 to FIG. 5.

Figure 6:
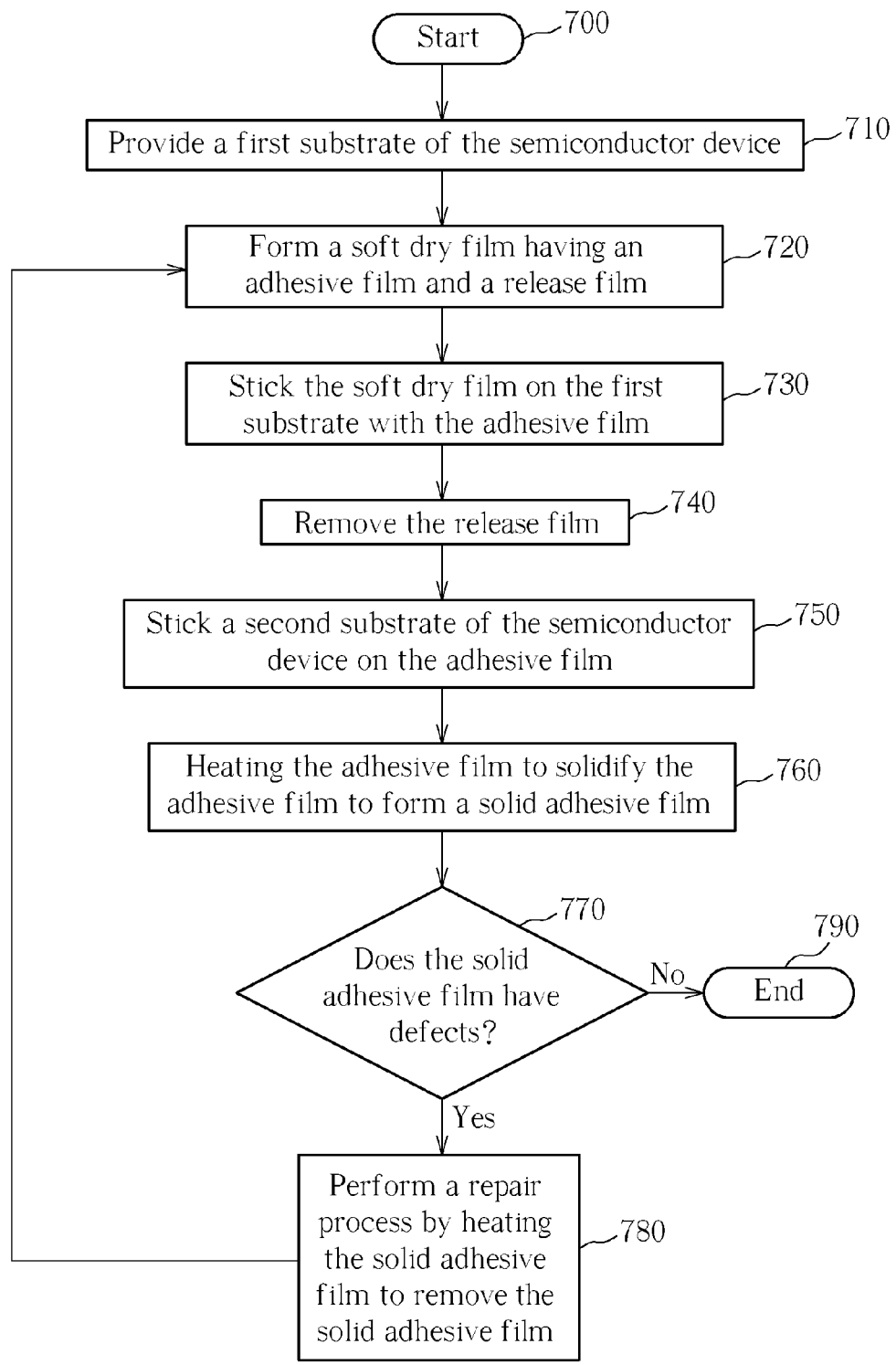
FIG. 6 is a flowchart showing a fabricating method of a semiconductor device in accordance with the embodiment of the present invention.

Please refer to FIG. 6. FIG. 6 is a flowchart showing a fabricating method of a semiconductor device in accordance with above embodiment of the present invention. Provided that substantially the same result is achieved, the steps of the process flowchart need not be in the exact order shown and need not be contiguous, that is, other steps can be intermediate. The fabricating method of the present invention comprises the following steps:

Step 700: Start.

Step 710: Provide a first substrate of the semiconductor device.

Step 720: Form a soft dry film having an adhesive film and a release film.

Step 730: Stick the soft dry film on the first substrate with the adhesive film

Step 740: Remove the release film.

Step 750: Stick a second substrate of the semiconductor device on the adhesive film Step 760: Heating the adhesive film to solidify the adhesive film to form a solid adhesive film.

Step 770: Determine whether the solid adhesive film has defects. If the solid adhesive film has defects, go to Step 780; if the solid adhesive film does not have defects, go to Step 790.

Step 780: Perform a repair process by heating the solid adhesive film to remove the solid adhesive film, and go back to Step 720.

Step 790: End.

Briefly summarized, the semiconductor device and the fabricating method thereof disclosed by the present invention can provide higher positioning precision, higher production amount, and higher peeling strength for the semiconductor device applied to a compact camera module (CCM), a wafer level lens, or a pico projector. The thickness of the adhesive film of the semiconductor device can be adjusted according to different design requirements, and the solid adhesive film of the semiconductor device is repairable.

Those skilled in the art will readily observe that numerous modifications and alterations of the device and method may be made while retaining the teachings of the invention.

What is claimed is:

1. A fabricating method of a semiconductor device, comprising:
   providing a first substrate;
   forming a soft dry film having an adhesive film and a release film;
   sticking the soft dry film on the first substrate with the adhesive film;
   removing the release film;
   sticking a second substrate on the adhesive film;
   heating the adhesive film to solidify the adhesive film to form a solid adhesive film; and
   performing a repair process by heating the solid adhesive film to remove the solid adhesive film, wherein the solid adhesive film is solid when removed.

2. The fabricating method of claim 1, wherein the step of forming the soft dry film further comprises:
   adjusting a thickness of the adhesive film.

3. The fabricating method of claim 1, wherein the adhesive film comprises a thermal set material, a thermal plastic material, or an epoxy resin.

* * * * *